United States Patent [19]

Yanniello

[11] Patent Number: 5,443,358
[45] Date of Patent: Aug. 22, 1995

[54] INDEXING PART LOADER

[75] Inventor: David J. Yanniello, Goodrich, Mich.

[73] Assignee: Burton Industries, Inc., Goodrich, Mich.

[21] Appl. No.: 56,379

[22] Filed: Apr. 30, 1993

[51] Int. Cl.6 .............................................. B65G 59/02
[52] U.S. Cl. ............................... 414/796.9; 414/223; 414/728; 414/776; 414/783; 414/796.7
[58] Field of Search ............... 414/223, 226, 728, 754, 414/776, 783, 796.7, 924, 796.4; 901/4, 30, 35

[56] References Cited

U.S. PATENT DOCUMENTS

| | | | |
|---|---|---|---|
| 4,195,961 | 4/1980 | Waiblinger | 414/796.7 |
| 4,715,113 | 12/1987 | Wickham | 414/226 |
| 4,886,592 | 12/1989 | Anderle et al. | 414/223 |
| 4,921,397 | 5/1990 | Watanabe | 414/796.7 |
| 4,932,357 | 6/1990 | Tamuro et al. | 414/226 |
| 4,955,780 | 9/1990 | Shimane et al. | 414/783 |
| 5,054,991 | 10/1991 | Kato | 414/783 |
| 5,102,280 | 4/1992 | Poduje et al. | 414/783 |
| 5,165,340 | 11/1992 | Karlyn et al. | 414/797 |
| 5,308,222 | 5/1994 | Bacchi et al. | 414/783 |

Primary Examiner—Michael S. Huppert
Assistant Examiner—Gregory A. Morse
Attorney, Agent, or Firm—Gifford, Krass, Groh, Sprinkle, Patmore, Anderson & Citkowski

[57] ABSTRACT

An indexing part loader for orientating a part for transfer and subsequent use. A transfer machine has a carousel magazine mounted thereon, with each magazine containing a stack of parts. The parts are sequentially lifted out of the magazine by a pickup head. The pickup head has a displacement mechanism which advances the part into an indexing head. The pickup head rotates the part within the indexing head until sensors within the indexing head determine the part to be in a proper angular position. The part is then withdrawn from the indexing head and advanced to a subsequent use position.

2 Claims, 4 Drawing Sheets

INDEXING PART LOADER

BACKGROUND OF THE INVENTION

1. Field of the Invention

The present invention relates to part transfer machines and, more particularly, to a part transfer machine for sensing, picking up, indexing and transferring a ring-shaped part into a use position.

2. Description of the Prior Art

Means are known in the art for loading a ring-shaped part into a machine such as an injection molding machine for performing an injection molding process on the part. Such parts are commonly used in vehicle fuel tanks and are positioned at the fuel tank opening. Conventionally, the loading and unloading of the part has been performed by manual operation.

The shortcoming with manual loading is the lengthy time required to sequentially load and unload each part from the machine. Another shortcoming is the requirement that an operator always be on duty to perform the loading and unloading of the part. Also, the part must be precisely aligned in its station within the machine in order for the molding process to be effective.

SUMMARY OF THE INVENTION

The present invention is directed to a part transfer machine for sequentially sensing, picking up, indexing and transferring ring-shaped parts into a use position. A carousel magazine holder is provided within a machine frame and has a plurality of circumferentially spaced tubular magazines. Each of the tubular magazines contains a vertical stack of parts.

The magazines are successively aligned with an unloading station. An unloading mechanism at the station elevates a stack of parts contained within a magazine. A mechanism located adjacent the top of the magazine senses the top part and separates the part from the remainder of the stack. A pickup head located above the unloading point rotates to a horizontally disposed pickup position to grip the separated part. The pickup head is then rotated to a vertical transport position for transporting the part.

The part is transported to a position where it faces an indexing head. Displacement means are provided in the pickup head for advancing the part into the indexing head. The part is rotated in the indexing head. A set of sensors are provided in the indexing head for detecting the desired angular position for the part. A shot pin within the indexing head is advanced to abut against the part when it has reached this desired angular position.

A shuttle mechanism moves the pickup head and part once the part is located in its ideal angular position. The displacement means then advances the part into the use position, such as a blow molding machine, where it is then treated in a known fashion.

In a further embodiment, a plurality of pressure pads are provided on the bottom of legs upon which the machine is supported. The pressure pads provide air cushions to enable the machine to be easily moved into and out of the use position so as to permit easy access to the use machine for maintenance or other purposes such as changing molds. Leveling air cylinders are located adjacent to each leg. The legs are extensible to fixed positions when the transfer machine is moved into the use position and the leveling air cylinders level the machine upon the floor surface.

The frame of the part transfer machine may also include upper and lower frame members which are separable so that the height of the part transfer machine can be changed in insertion of the intermediate frame member.

BRIEF DESCRIPTION OF THE DRAWING

The various embodiments of the present invention will be described with reference to the accompanying drawings in which like reference numbers refer to like parts throughout the several views and in which.

DESCRIPTION OF THE PREFERRED EMBODIMENT

Figure 1:
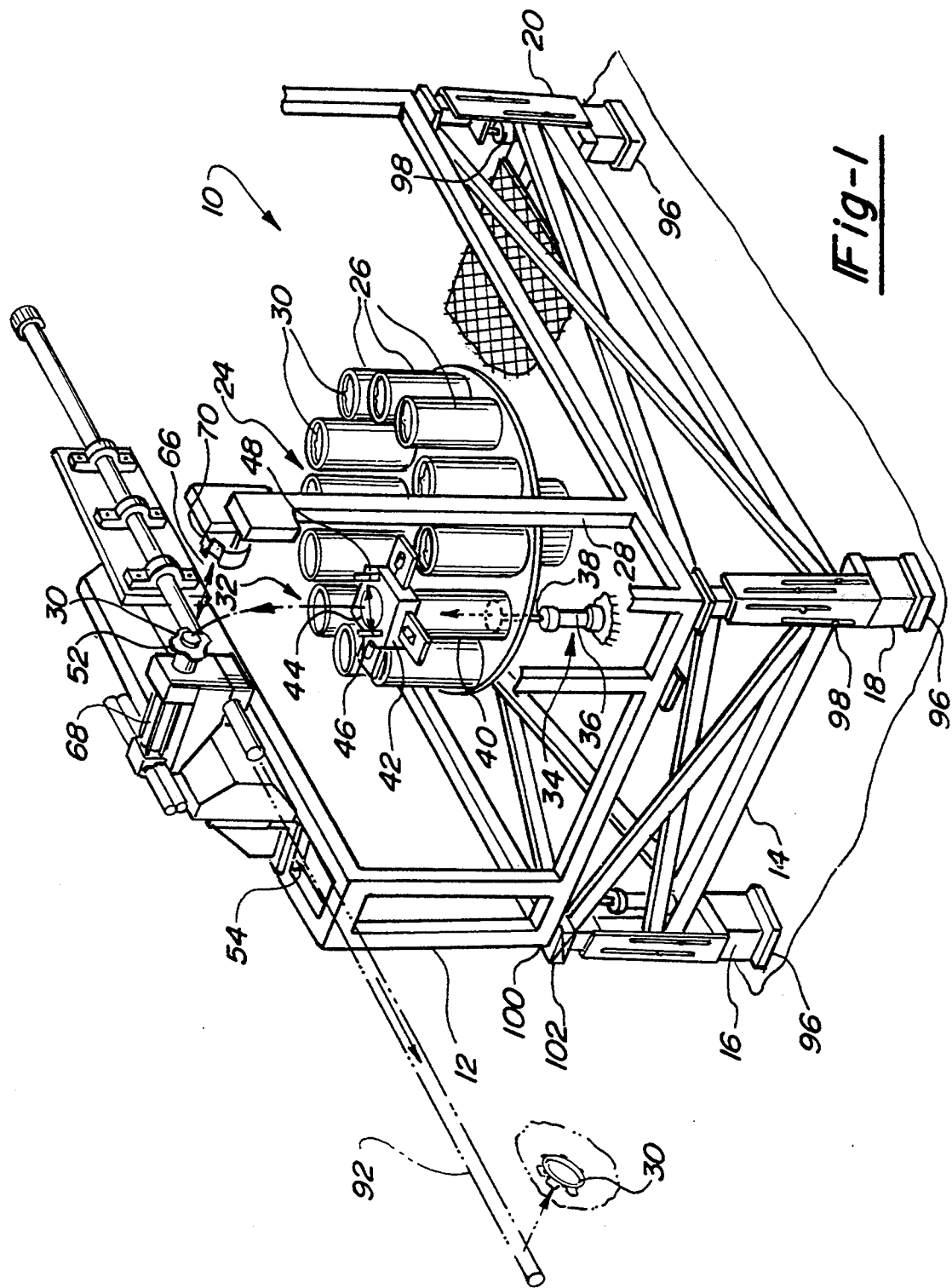
FIG. 1 is a perspective view of the part transfer machine of the present invention.

Referring to FIG. 1, the part transfer machine 10 of the present invention is shown as being divided into an upper frame member 12 and a lower frame member 14. The lower frame member 14 has four downwardly-extending legs, three of which, legs 16, 18 and 20, can be seen. A carousel magazine holder 24 is mounted for rotation within the machine 10 and carries thereupon a number of magazines 26 equidistantly spaced from a central axis 28 of the holder 24 and around its outer peripheral edge. Each of the magazines 26 carries a number of stacked parts 30 therein. The magazine holder 24 is rotatable about its axis 28 so as to locate a given magazine 26 at an unloading station 32.

An unloading mechanism 34 is located at the unloading station 32. The unloading mechanism 34 can be a fluid driven cylinder 36 with a shaft 38 and a flat support portion 40 attached to an upper end of the shaft 38. The shaft 38 and support portion 40 may be actuated to elevate a stack of parts 30 contained within the magazine 26, a predetermined distance out of the magazine 26.

Figure 2:
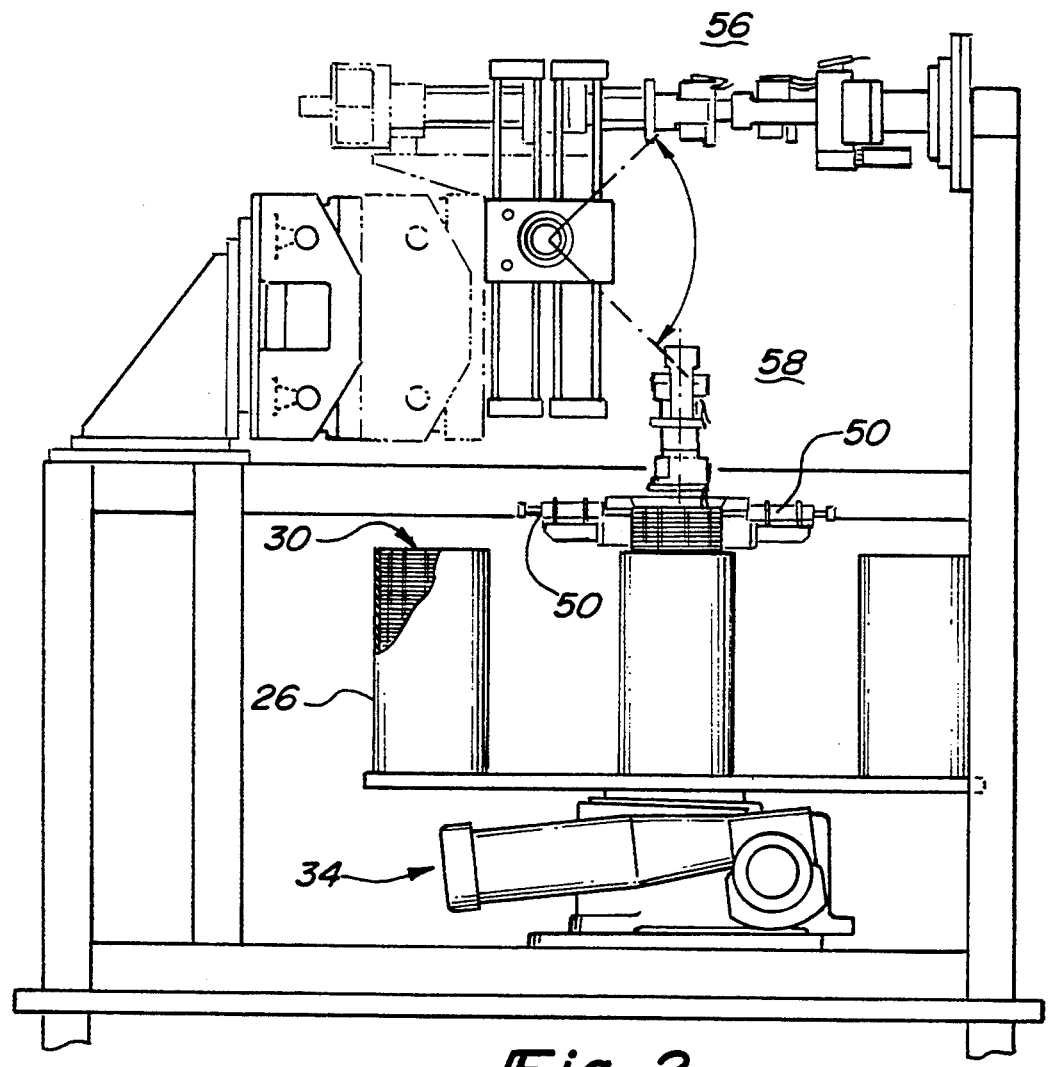
FIG. 2 is a front elevational view of the machine shown in FIG. 1 and illustrating the rotation of the pickup head for transferring the separated part from the stack within the magazine.

A separating mechanism 42 is located over the stack of parts 30 elevated from the magazine 26. A sensor 44 is located in the mechanism in the form of a continuous sensor beam which extends between two posts 46 and 48 on opposite edges of the mechanism 42. Referring to FIG. 2, the mechanism 42 further includes a set of grippers 50 which are inwardly directed so as to be aligned with the uppermost of the elevated stack of parts 30. Upon tripping the sensor beam by the uppermost part 30, the grippers 50 are actuated inwardly to grip the ring part 30 and separate the part from the remainder of the stack.

Figure 4:
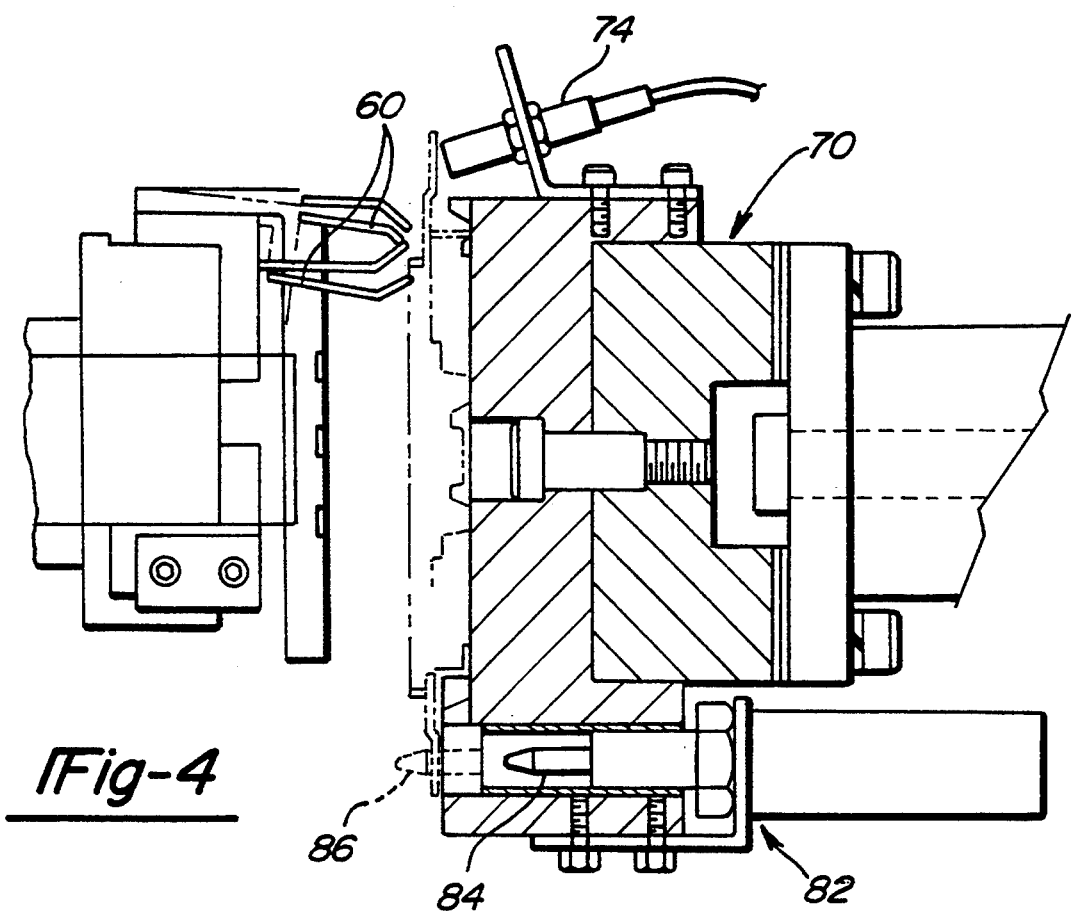
FIG. 4 is a cut-away view along line 4—4 of FIG. 5 and showing the sensors and shot pin of the indexing head for establishing the appropriate angular position for the part.

A pickup head 52 is located on a slide mechanism 54 above the magazine carousel 24. The pickup head 52 is rotatable between a vertical transport position 56 and a horizontally disposed pickup position 58 (see FIG. 2). The pickup head 52 is rotated downwardly, as shown in FIGS. 1 and 2, from position 56 to position 58 where it is in communication with the ringed part 30 held by the separating mechanism 42. A plurality of fingers 60 (FIG. 4) are located on the pickup head 52 adjacent the ring part 30. The fingers 60 interlock with the ring part along its inner diameter and secure the ring part. The part 30 may then be rotated by the pickup head from its horizontal pickup position 58 to its vertical transport position 56. The stack of parts 30 is subsequently elevated a further predetermined amount by the elevating mechanism 34 to separate the next part.

Figure 3:
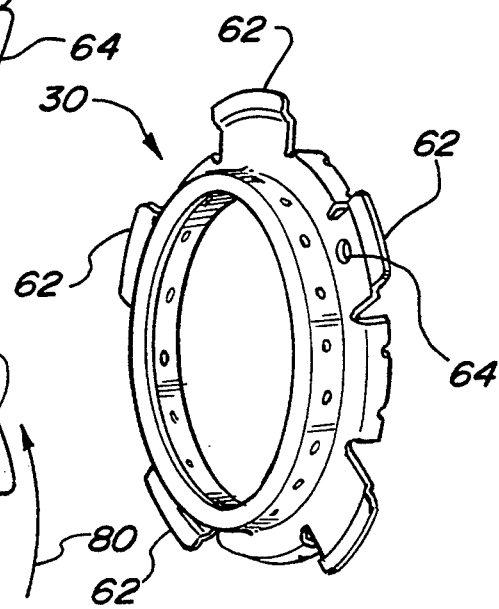
FIG. 3 is an elevational view of a ring part that can be handled by the transfer machine of the present invention.

Referring to FIG. 3, the part 30 has a plurality of equally circumferentially spaced, laterally extending ears 62. The ears have a common width. One of the ears 62' has a locating aperture 64 formed therethrough. The part 30 is a hollow ring with an open inner diameter.

Figure 6A:
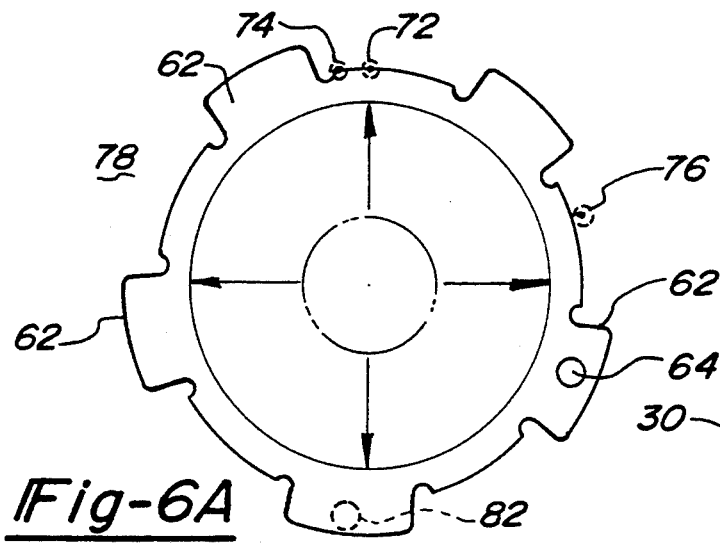
FIG. 6A is a view of the ring part of FIG. 3 shown in a position similar to FIG. 5 at a first indexing position of the part.
Figure 5:
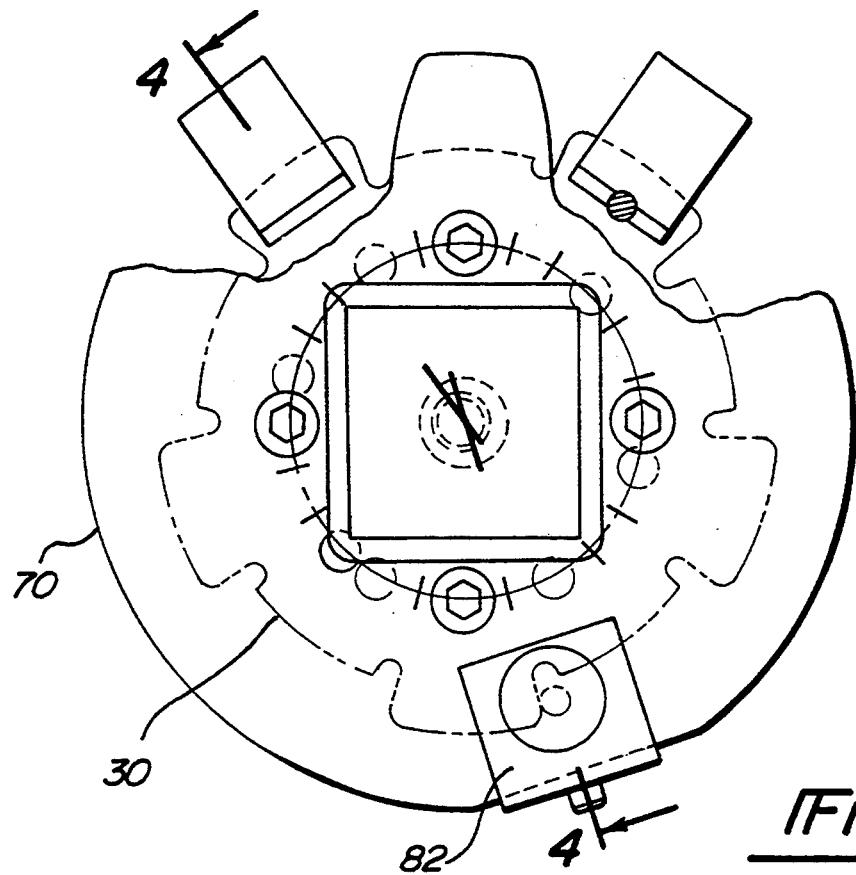
FIG. 5 is an end view of the indexing head of the transfer machine showing the rotational aspect of the ringed part.

The travelling mechanism 54 advances the part 30 from the pickup position 58 to an indexing position 66. A displacement piston 68 is contained within the travelling mechanism 54 and advances the pickup head 52 and part 30 to a position in which the part is surrounded by an indexing head 70. The indexing head 70 has first, second and third sensors 72, 74 and 76 respectively. With reference again to FIG. 4 and to FIGS. 6A-6C, the indexing head has three sensors, only the second one of which is illustrated in FIG. 4 at 74. Referring to FIG. 5, an end view of the part 30 carried by the pickup head and inserted within the indexing head 70 is shown.

Referring again to FIG. 6A, in a first indexing position 78, the first sensor 72 and the second sensor 74 are spaced apart in a direction of rotation of the part 30 less than the width of one of the ears 62 of the part. The third sensor 76 is spaced apart from the first and second sensors 72 and 74 a distance approximately equal to the circumferential spacing between the ears 62.

Figure 6B:
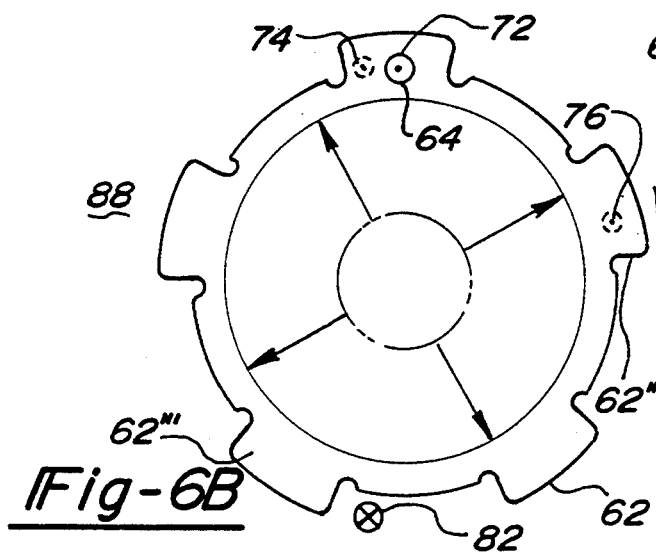
FIG. 6B is a view similar to FIG. 6A showing the part on a first sensing position during rotation of the part.

Once the part 30 is aligned in its first indexing position 78, the fingers 60 on the pickup head 52 begin to rotate the part 30 in a counter clockwise direction as shown by the directional arrow 80, see FIG. 6b. The part 30 is rotated until the first sensor 72 sees through the locating aperture 64 and the third sensor 76 senses the ear 62" upstream and adjacent to the ear 62' having the aperture 64. Referring again to FIG. 4, a shot pin 82 is located within the indexing head 70. The shot pin 82 is shown in solid in a retracted position 84 and in phantom in an actuated position 86. Upon achieving the angular position 88 shown in FIG. 6B, the shot pin 82 is actuated past the ring part 30 and between two ears 63 of the ring part 30.

Figure 6C:
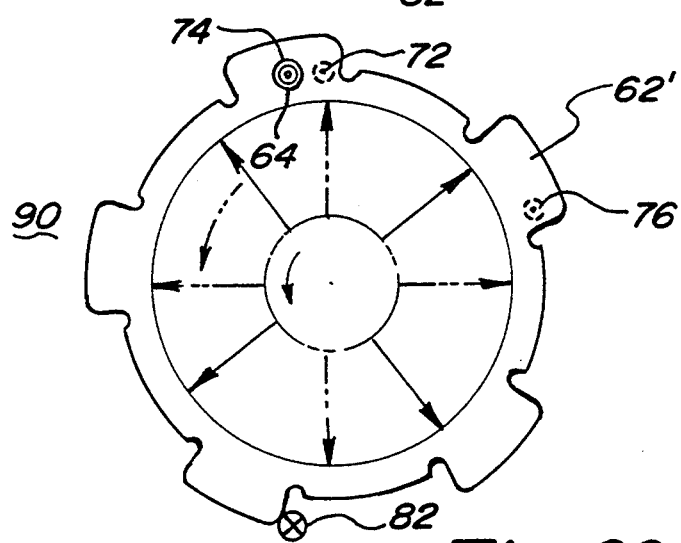
FIG. 6C is a view similar to FIGS. 6A and 6B showing the part' in a second sensing position in which the ring part is in proper angular orientation.

The part 30 continues to be rotated by the pickup head 52 until the shot pin 82 abuts against an ear of the ring, as shown in FIG. 6C. If the shot pin 82 has properly engaged the ring part 30, the second sensor 74 will be in alignment with the aperture 64 in the ear of the part and the third sensor 76 will continue to sense the ear 62" upstream and adjacent to the ear 62' having the aperture. At this point the part is in its correct angular position 90 for treatment in its subsequent use position. The part 30 is then retracted by the displacement means 68 from the indexing head 70 and is advanced to the use position 92 and deposited there by the pickup head for treatment and discharge. As previously stated, the use position 92 is where a known process, such as blow molding machine 94 is located (see FIG. 7). Such a process is well known in the art and further description is unnecessary.

After the part is deposited in the use position 92 by the pickup head 52, the pickup head 52 returns to its original position 56. The pickup head 52 is then again rotated from its horizontally disposed transport position 56 to its vertical pickup position 58 in order to pickup another part 30 elevated from the magazine 26 by the lift mechanism 34 and gripped by the separating mechanism 42. The transfer machine 10 angularly orientates the parts contained in the magazines one at a time for transfer to the use position. Upon the emptying of one magazine 26, the carousel 24 rotates another magazine 26 to the unloading station 32 and the process is repeated for each part until that magazine 26 is emptied.

Figure 7:
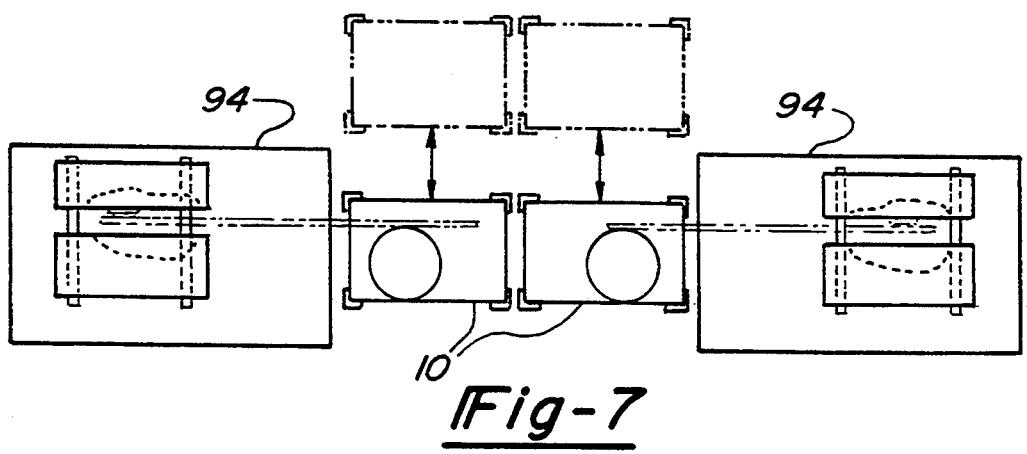
FIG. 7 is a plan view showing a pair of transfer machines which are movable into and out of a use position associated with blow molding machines.

Referring again to FIGS. 1 and 7, in a preferred embodiment the legs of the lower frame member 14 include a plurality of pressure pads 96 located at the bottom of the legs. A supply of pressurized air (not shown) is provided to each of the pads 96 in order to activate the pads 96. As shown in FIG. 7, the activation of the pressure pads 96 enables the transfer machines 10 to be easily moved in and out of position with respect to the injection molding or other machine 94. Activation of the pressure pads 96 greatly decreases the force necessary to move the machine 10, enabling an operator to manually reposition it as desired.

Referring again to FIG. 1 a leveling air cylinder 98 is located adjacent to each leg. The legs are extensible and the leveling cylinders 98 enable the machine 10 to be leveled.

The upper 12 and lower 14 frame members shown in FIG. 1 are also separable at 100 so that the height of the part transfer machine can be changed by insertion of an intermediate frame member 102 between the upper and lower frame members.

Having described my invention, additional embodiments will be obvious without departing from the scope of the invention as set forth in the appended claims.

I claim:

1. A part transfer machine comprising:
   a carousel magazine holder having a plurality of circumferentially spaced tubular magazines, each for containing a vertical stack of parts;
   means for successively aligning one of said magazines with an unloading station;
   an unloading mechanism at said station arranged to elevate a stack of parts in said aligned magazine;
   means for sensing a part adjacent the top of said magazine;
   means responsive to said sensor for separating the top part from the stack;
   a pickup head arranged for rotation between a horizontally disposed pickup position in which the separated top part is gripped and a vertical transport position;
   an indexing head;
   displacement means in said pickup head for advancing said part into said indexing head;
   means in said pickup head for rotating said part;

said indexing head stopping rotation of said part at a predetermined angular position;

said displacement means retracting said part from said indexing head to said transport position while maintaining said predetermined angular position; and a shuttle mechanism for moving said pickup head into alignment with a use position;

whereby said displacement means can advance said part into said use position.

2. A part transfer machine comprising:

a part pickup head having means for gripping a ring shaped part, said part having a plurality of equally circumferentially spaced, laterally extending ears having a common width, one of said ears having a locating aperture;

means in said pickup head for rotating said part;

an indexing head having a first sensor and a second sensor spaced apart downstream in a direction of rotation of said part less than the width of one of said ears and a third sensor spaced apart from said first and second sensors a distance approximately equal to the circumferential spacing between said ears;

displacement means in said pickup head for advancing said part into said indexing head;

a shot pin movable into a path of rotation of said part when said first sensor senses said aperture and said third sensor senses the ear upstream and adjacent to the ear having the aperture, rotation of said part being continued until the shot pin makes contact with a portion of said part, arresting rotation of the part in a predetermined angular position, and the predetermined angular position of said part being confirmed by said second sensor sensing said aperture and said third sensor continuing to sense the ear upstream and adjacent to the ear having the aperture, allowing said displacement means to retract said part from said indexing head while maintaining said predetermined angular position.

* * * * *

UNITED STATES PATENT AND TRADEMARK OFFICE
CERTIFICATE OF CORRECTION

PATENT NO. : 5,443,358
DATED : August 22, 1995
INVENTOR(S) : David J. Yanniello

It is certified that error appears in the above-indentified patent and that said Letters Patent is hereby corrected as shown below:

Column 3, line 51, delete "FIG. 6b" and insert --FIG. 6B--.

Signed and Sealed this

Ninth Day of January, 1996

*Attest:*

BRUCE LEHMAN

*Attesting Officer*     *Commissioner of Patents and Trademarks*